(12) United States Patent
Ruff (10) Patent No.: US 6,591,602 B1
(45) Date of Patent: Jul. 15, 2003

(54) EJECTION SEAT ROCKET MOTORS (75) Inventor: Stephen Anthony George Ruff, Buckinghamshire (GB)

(73) Assignee: Martin-Baker Aircraft Company Limited, Near Uxbridge (GB)

( * ) Notice: Subject to any disclaimer, the term of this patent is extended or adjusted under 35 U.S.C. 154(b) by 0 days.

(21) Appl. No.: 09/882,365

(22) Filed: Jun. 15, 2001

(30) Foreign Application Priority Data

Jun. 16, 2000 (GB) .............................................. 0014853

(51) Int. Cl.$^7$ ................................................. F02K 9/97
(52) U.S. Cl. ..................... 60/229; 60/263; 244/122 AD
(58) Field of Search ............ 60/229, 263; 244/122 AD (56) References Cited

U.S. PATENT DOCUMENTS 3,740,005 A * 6/1973 Rivers ................. 244/122 AD

* cited by examiner

*Primary Examiner*—Ehud Gartenberg
(74) *Attorney, Agent, or Firm*—Fulwider Patton Lee & Utecht, LLP (57) ABSTRACT

A rocket motor is disclosed that is suitable for use with an ejection seat. The rocket motor includes a combustion chamber, and has a plurality of spaced apart outlets arranged in fluid communication with the combustion chamber, to allow the passage of exhaust gases upon ignition of a propellant within the combustion chamber. Each exhaust outlet is arranged to direct the exhaust gases along respective fixed lines of thrust. The arrangement is such that the resultant thrust generated by the rocket motor acts along the line non-parallel with at least one of the fixed lines of thrust so as to direct the rocket motor along the curved trajectory. The secondary outlets may be smaller than the primary outlets and are selectively closable by valves.

17 Claims, 6 Drawing Sheets

EJECTION SEAT ROCKET MOTORS

THE PRESENT INVENTION relates to an ejection seat rocket motor and, more particularly, relates to a rocket motor intended for use with an ejection seat in an aircraft.

Ejection seats are commonly used in military- aircraft where the risk of aircraft failure or combat damage is high. Ejection seats allow the air crew to escape from stricken aircraft and typically provide a safe, reliable means of escape.

Ejection seats are conventionally provided with an elongate rocket motor fitted to the seat below the sitting platform and positioned in such a way that the thrust of the rocket motor acts close to the centre of gravity of the seat/occupant combination. Such rocket motors are positioned transversely across the seat and have exhaust nozzles at either end to allow for the passage of exhaust gases therethrough. The thrust from the rocket motor serves to fire the ejection seat away from the aircraft. However, it is usual only to fire the main rocket motor of an ejection seat once the ejection seat is clear of the aircraft. Initial propulsion of the ejection seat out of the aircraft cockpit is effected by one or more pyrotechnic charges which serve to eject the seat from the cockpit along a system of rails. Only once the seat is clear of the cockpit is the rocket motor fired to ensure that a safe distance is put between the seat and the aircraft tail and then to allow full and safe deployment of the ejection seat parachute.

It is advantageous to be able to control the trajectory of an ejection seat from the aircraft cockpit rather than simply to rely upon a substantially vertical trajectory. One particular instance in which such control of the ejection seat trajectory is advantageous is in the situation of an aircraft cockpit housing two air crew, for example, a pilot and co-pilot. In this situation it is advantageous to eject the pilot and co-pilot along diverging trajectories so as to avoid or at least minimise the risk of the pilot and co-pilot colliding with one another upon ejection from the aircraft. There are other situations in which a non-vertical ejection trajectory is advantageous, as will be explained in more detail hereinafter.

One known way in which divergence of pilot and co-pilot ejection trajectories is effected is to provide each ejection seat with an additional rocket motor to provide lateral thrust. For example, the pilot's ejection seat may be provided with a thrust nozzle pointing towards the port side of the aircraft whilst the co-pilot's ejection seat may be provided with a thrust nozzle pointing towards the starboard side of the aircraft. Upon ejection, these additional rocket motors provide lateral thrust in opposite directions to direct the pilot's and co-pilot's seats along diverging trajectories away from one another. However, this type of arrangement suffers from several disadvantages. For example, the addition of extra lateral thrust rocket motors adds to the aircraft's total mass, increases the cost of the ejection seat and results in a bulky ejection seat causing problems of installation within the aircraft cockpit.

Another known way to provide control over the trajectory of an ejection seat is to provide the main rocket motor with a thrust vector control arrangement. Such thrust vector control arrangements are well-known in the art but are disadvantageous for use with ejection seats because they are complicated and add both weight and cost to the installation.

It is an object of the present invention to provide an improved ejection seat rocket motor.

According to one aspect of the present invention, there is provided an ejection seat rocket motor comprising a combustion chamber, a plurality of spaced apart exhaust outlets in fluid communication with the combustion chamber to allow the passage of exhaust gases upon ignition of a propellant within the combustion chamber, each exhaust outlet being arranged to direct the exhaust gases along a respective fixed line of thrust, the arrangement being such that the resultant thrust generated acts along a line non-parallel with at least one of the fixed lines of thrust so as to direct the rocket motor along a curved trajectory.

Preferably, the thrust generated by at least one of the exhaust outlets differs in magnitude from the thrust generated by the or each other exhaust outlets.

Advantageously, the exhaust outlets are arranged such that their respective fixed lines of thrust are all substantially parallel with one another.

Conveniently, the ejection seat rocket motor further comprises selection means operable to select from said plurality of exhaust outlets, one or more exhaust outlets through which to allow the passage of exhaust gas upon ignition of the propellant within the combustion chamber.

According to another aspect of the present invention, there is provided an ejection seat rocket motor comprising a combustion chamber, a plurality of exhaust outlets in fluid communication with the combustion chamber, and selection means operable to select from said plurality of exhaust outlets one or more exhaust outlets through which to allow the passage of exhaust gas upon ignition of a propellant within the combustion chamber.

Preferably, said selection means comprises a valve means associated with at least one of the plurality of exhaust outlets, the valve means being moveable from a first position in which substantially no exhaust gas is allowed to pass through the respective exhaust outlet, to a second position in which substantially unrestricted flow of exhaust gas is allowed through the respective exhaust outlet.

Advantageously, said selection means comprises a valve means associated with at least one of the plurality of exhaust outlets, the valve means being moveable from a first position in which substantially unrestricted flow of exhaust gas is allowed through the respective exhaust outlet, to a second position in which substantially no exhaust gas is allowed to pass through the respective exhaust outlet.

Conveniently, the ejection seat rocket motor further includes valve indicator means arranged to provide a visual indication from outside the rocket motor and whether the or each valve means is in its respective first or second position.

Advantageously, said selection means comprises a fuse actuable to allow movement of one or more of said valve means from their respective first positions to their respective second positions.

Conveniently, said selection means comprises a separate said fuse associated with each said valve means.

Preferably, the or each fuse comprises an exclusive charge.

Advantageously, the or each fuse is arranged to move a locking element into or out of locking engagement with the or each valve means upon actuation of the fuse so as to prevent or allow respectively movement of the or each valve means from its first position to its second position.

Conveniently, the ejection seat rocket motor further includes locking element indicator means arranged to provide a visual indication from outside the rocket motor of whether the or each locking element is in or out of locking engagement with the or each valve means.

Preferably, the ejection seat rocket motor comprises at least one primary exhaust outlet and at least one secondary exhaust outlet, the magnitude of thrust produced by the or each primary exhaust outlet upon ignition of a propellant within the combustion chamber being greater than the magnitude of thrust produced by the or each second exhaust outlet.

Advantageously, the or each primary exhaust outlet is arranged so as always to allow the passage of exhaust gas upon ignition of a propellant within the combustion chamber.

Conveniently, the selection means is arranged to select whether or not to allow the passage of exhaust gas to any of the or each secondary exhaust outlets.

Preferably, the ejection seat rocket motor is provided with an ignition fuse to ignite a propellant within the combustion chamber.

Advantageously, each exhaust outlet is provided with an nozzle.

Conveniently, the ejection seat rocket motor is provided with a combustible propellant within a combustion chamber.

Preferably, the propellant is a composite propellant comprising a fuel and an oxidant.

Advantageously, the propellant is non-platonised.

There is also provided an ejection seat provided with a rocket motor in accordance with the present invention.

So that the invention may be more readily understood and so that further features thereof may be appreciated, an embodiment of the invention will now be described by way of example, with reference to the accompanying drawings, in which.

Figure 1:
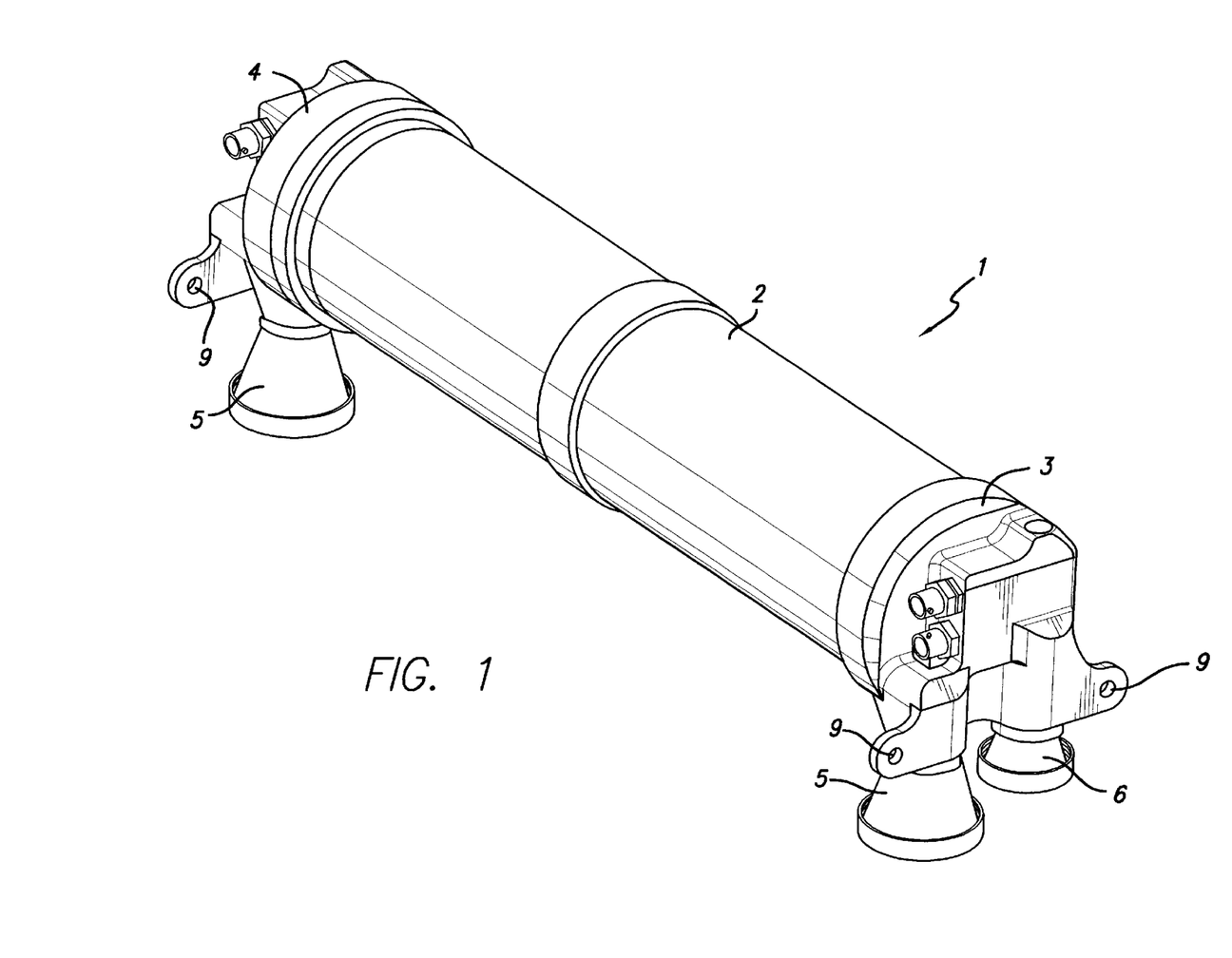
FIG. 1 is a perspective view of an ejection seat rocket motor in accordance with the present invention.
Figure 2:
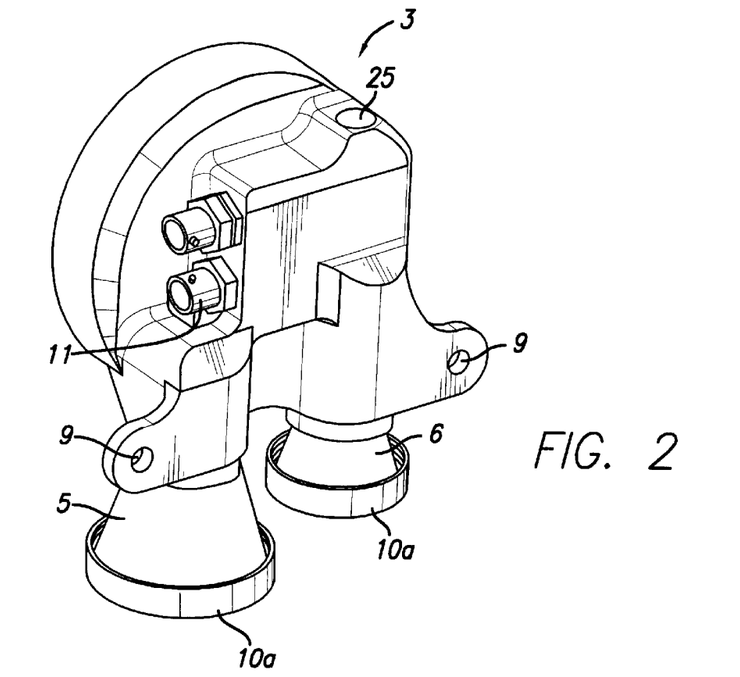
FIG. 2 is a perspective view of the right hand end cap of the rocket motor as illustrated in FIG. 1.

Referring initially to FIG. 1, an ejection seat rocket motor 1 is illustrated which comprises a generally cylindrical, hollow body portion 2 closed at the right hand end as illustrated by a right hand end cap 3 and closed at the left hand end as illustrated by a left hand end cap 4. Each end cap 3, 4 carries a primary exhaust nozzle 5 and a smaller secondary exhaust nozzle 6 (the secondary exhaust nozzle 6 of the left hand end cap 4 not being visible in FIG. 1). The exhaust nozzles 5, 6 each communicate with a respective exhaust outlets 7, 8 (illustrated more clearly in FIGS. 5 and 8).

The cylindrical body portion 2 and the end caps 3, 4 together define a combustion chamber for the ignition of a combustible propellant. The exhaust outlets 7, 8 are arranged to be in fluid communication with the combustion chamber to allow for the passage of exhaust gases upon ignition of the propellant within the combustion chamber, and hence to produce thrust in the opposite direction to expulsion of the exhaust gases. The primary exhaust outlets, due to their larger sizes, produce more thrust than the secondary exhaust outlets 8.

Each end cap 3, 4 is provided with a number of fixing points 9 for secure attachment to the frame of an ejection seat. The rocket motor 1 is secured to an ejection seat, for example a pilot's ejection seat and is orientated so as to be parallel to the pitch axis of the aircraft.

The right hand end cap 3 is illustrated in more detail in FIGS. 2 to 5 and will now be described in more detail.

The primary exhaust outlet 7 and the secondary exhaust outlet 8 are each provided with a closure disc 10 which initially seals the respective exhaust outlets. Upon ignition of the propellant within the combustion chamber, the increased pressure within the combustion chamber causes the closure discs 10 to rupture, thereby opening the respective exhaust outlets. The primary and secondary nozzles 5, 6 may additionally be provided with closure caps 10a which are ruptured or forced from the respective nozzles as the exhaust gases pass therethrough.

The right hand closure cap 3 carries a main ignition fuse 11 which may be connected electrically to an ejection control circuit. Upon ejection, the ejection control circuit supplies an appropriate electrical signal to the main ignition fuse 11 which energises the fuse and ignites the propellant within the combustion chamber of the rocket motor, thereby causing an increase in pressure within the combustion chamber.

Figures 4, 5:
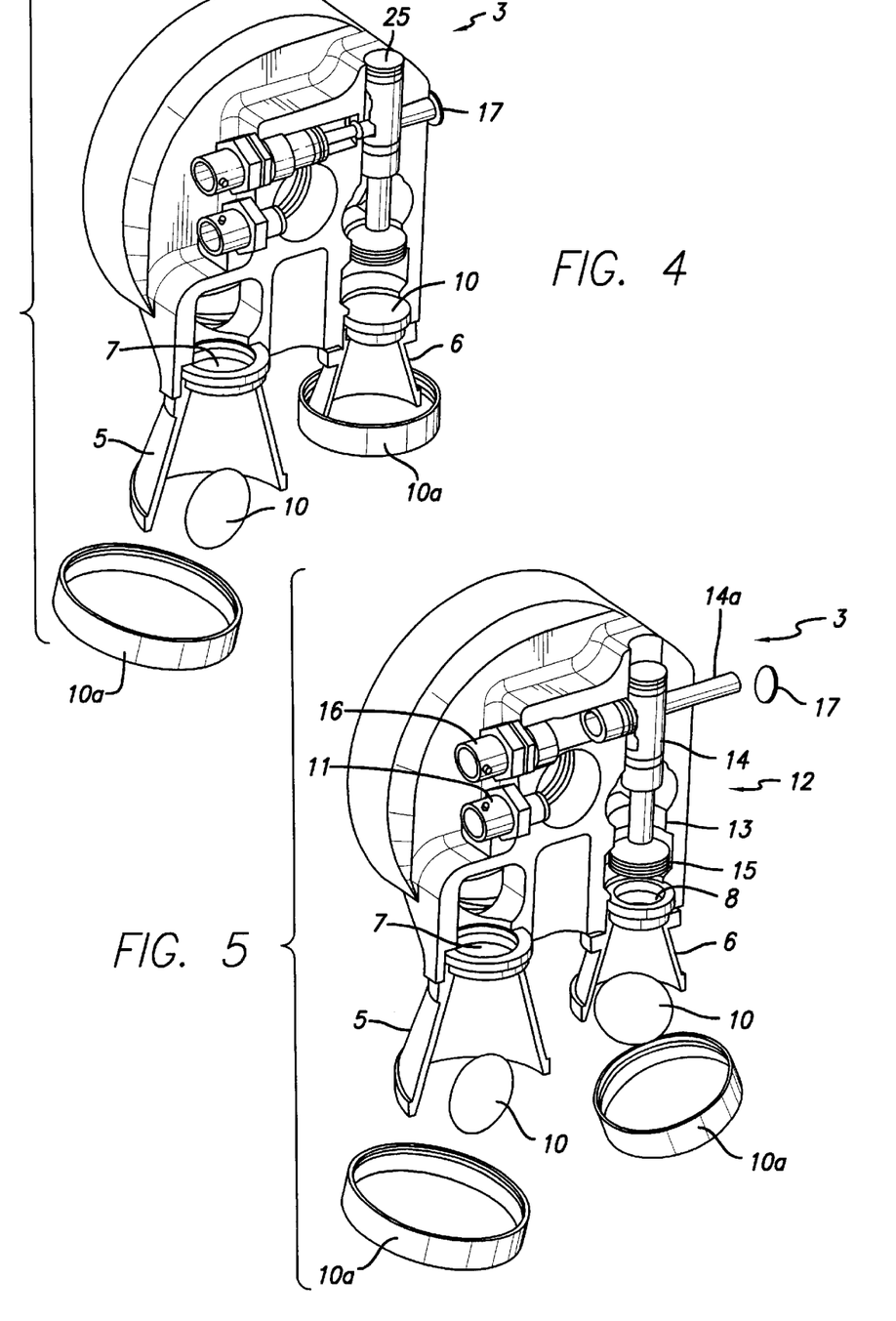
FIG. 4 is a view corresponding to that of FIG. 3 illustrating the arrangement upon ignition in a first mode of operation.
FIG. 5 is a view corresponding to that of FIGS. 3 and 4 illustrating the arrangement upon ignition in an alternative mode of operation.
Figure 6:
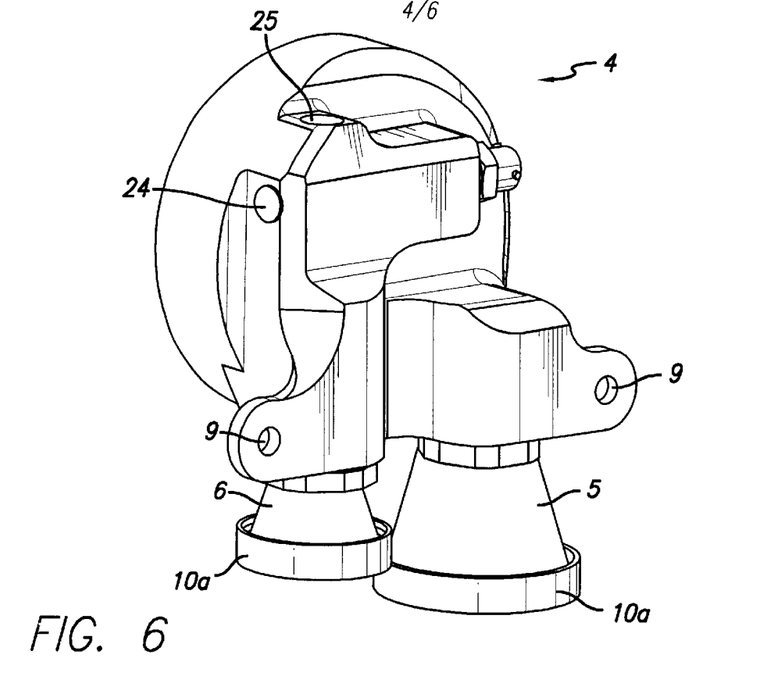
FIG. 6 is a perspective view of the left hand end cap of the rocket motor as illustrated in FIG. 1.

The primary exhaust outlet 7 is in constant fluid communication with the combustion chamber. Similarly, turning briefly to FIG. 7, the primary exhaust outlet 7 of the left hand end cap 4 is in constant fluid communication with the combustion chamber. Therefore upon ignition of the propellant within the combustion chamber 2, the closure disc 10 of each primary exhaust outlet 7 is caused to rupture and exhaust gases are expelled through both primary exhaust outlets 7 and their respective nozzles 5 thereby generating thrust. FIG. 4 illustrates the primary exhaust outlet 7 of the right hand end cap expelling exhaust gases.

The secondary exhaust outlet 8 of the right hand closure cap 3 communicates with the combustion chamber via a valve arrangement 12. The valve arrangement 12 comprises a valve seat 13 and a movable valve member 14. In the condition illustrated in FIG. 3, the valve member 14 is in a first position in which a valve surface 15 of the valve member 14 sealingly engages with the valve seat 13, thereby allowing no fluid communication between the secondary exhaust outlet 8 and the combustion chamber. The valve member 14 is held in this first position by a locking element 14a engaged therewith.

The locking element 14a acts in co-operation with an auxiliary fuse 16. The auxiliary fuse 16 is electrically connectable to the ejection control circuit and comprises an explosive charge. Under certain conditions, which will be explained in more detail hereinafter, the ejection control circuit provides an electrical signal to the auxiliary fuse 16, thereby energising the auxiliary fuse 16 and firing the explosive charge. The resulting explosion drives the locking element 14a away from the auxiliary fuse 16 to the position indicated in FIG. 5. In moving to this position, the locking element punches out an indicating seal 17 from the casing of the right hand end cap 3 so that it is then readily apparent by visually inspecting the exterior of the motor that the auxiliary fuse 16 has been fired and that the locking element 14a has been driven to the position illustrated in FIG. 5.

Figure 3:
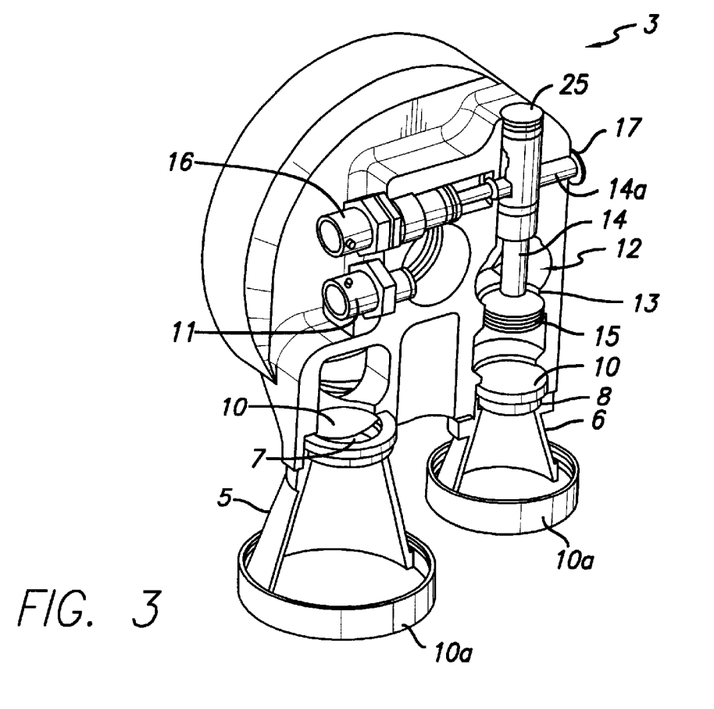
FIG. 3 is a view corresponding to that of FIG. 2 illustrating part of the right hand end cap in section.

When the locking element 14a assumes the position illustrated in FIG. 5, it is no longer in locking engagement with the valve member 14. This flow of exhaust gases from the combustion chamber drives the valve member 14, which is how free to move by virtue of being disengaged with the locking element 14a, away from its first position as illustrated in FIGS. 3 and 4 towards a second position illustrated in FIG. 5, in which the valve surface 15 is no longer in sealing engagement with the valve seat 13. The valve arrangement 12 thus allows the passage of exhaust gases through the secondary exhaust outlet 8, thereby causing its respective closure disc 10 to rupture. In this way, energisation of the auxiliary fuse 16 causes the secondary exhaust outlet 8 and its associated nozzle 6 to generate thrust by allowing the passage therethrough of exhaust gases.

Figure 7:
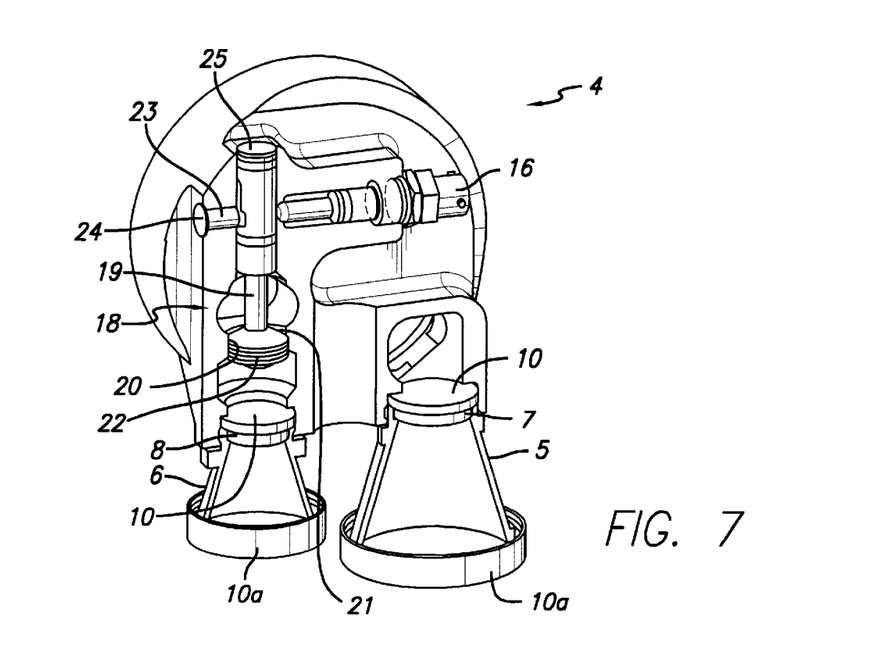
FIG. 7 is a view corresponding to that of FIG. 6 illustrating part of the left hand end cap in section.

Turning now to FIG. 7, the left hand end cap 4 of the rocket motor 1 is also provided with a valve arrangement 18 comprising a valve member 19. As illustrated in FIG. 7, the valve member 19 initially adopts a first position in which a valve surface 20 on the valve member 19 sealingly engages with a valve seat 21 provided around a passage fluidly connecting the secondary exhaust outlet 8 to the combustion chamber. The valve member 19 is held in this position by a shear pin 22 which serves temporarily to lock the valve member 19 in this first position.

The valve member 19 is again associated with a locking member 23. However, in the initial condition illustrated in FIG. 7, the locking member 23 does not lockingly engage the valve member 19 such that, were it not for the provision of the shear pin 22 holding the valve member 19 in position, the valve member 19 would be able to move with respect to the valve seat 21.

The locking member 23 is associated with an auxiliary fuse 16 of identical configuration to the auxiliary fuse 16 provided at the right hand end cap 3 of the rocket motor.

Figure 8:
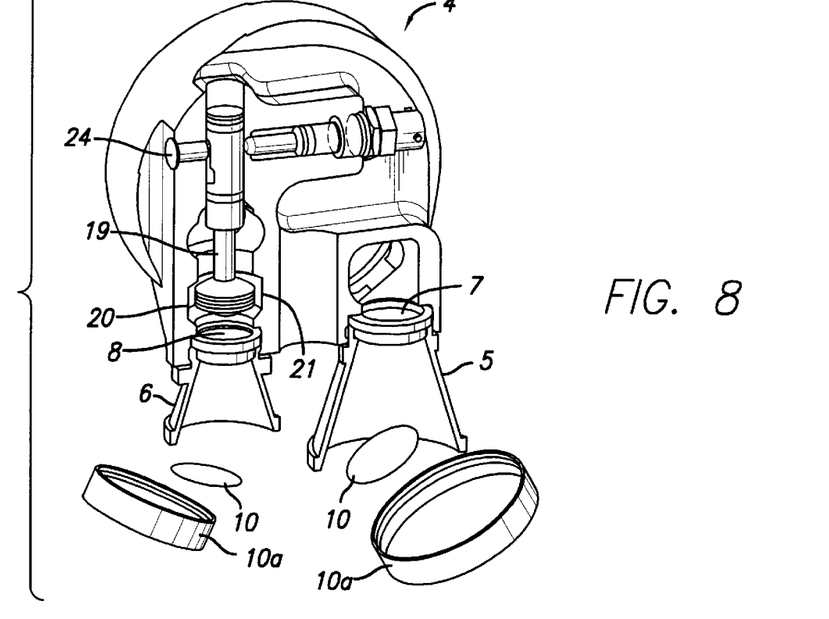
FIG. 8 is a view corresponding to that of FIG. 7 illustrating the arrangement upon ignition in a first mode of operation.

Upon energisation of the main ignition fuse 11 provided at the right hand end cap 3 of the rocket motor 1, the propellant within the combustion chamber is ignited and hence rapidly expands. This expansion of gas ruptures the closure disc 10 of the two primary exhaust outlets 7 (right hand end and left hand end) to allow the passage of exhaust gases therethrough. The increased pressure also acts upon the valve member 19 in the left hand end cap 4 urging the valve member 19 downwardly from the position indicated in FIG. 7. The shear pin 22 is arranged to fail under such conditions by either breaking itself or breaking away from the end cap 4 or the valve member 19. Failure of the shear pin 22 in this way allows the valve member 19 to move downwardly as illustrated in FIG. 8 under the action of the increased pressure within the combustion chamber. This downward movement of the valve member 19 causes the valve surface 20 and the valve seat 21 to become disengaged with the result that exhaust gases are allowed to flow through the secondary exhaust outlet 8 upon rupture of the associated closure disc 10. Therefore, non-energisation of the auxiliary fuse 16 of the left hand end cap results in the left hand end secondary exhaust outlet 8 firing and producing thrust.

Figure 9:
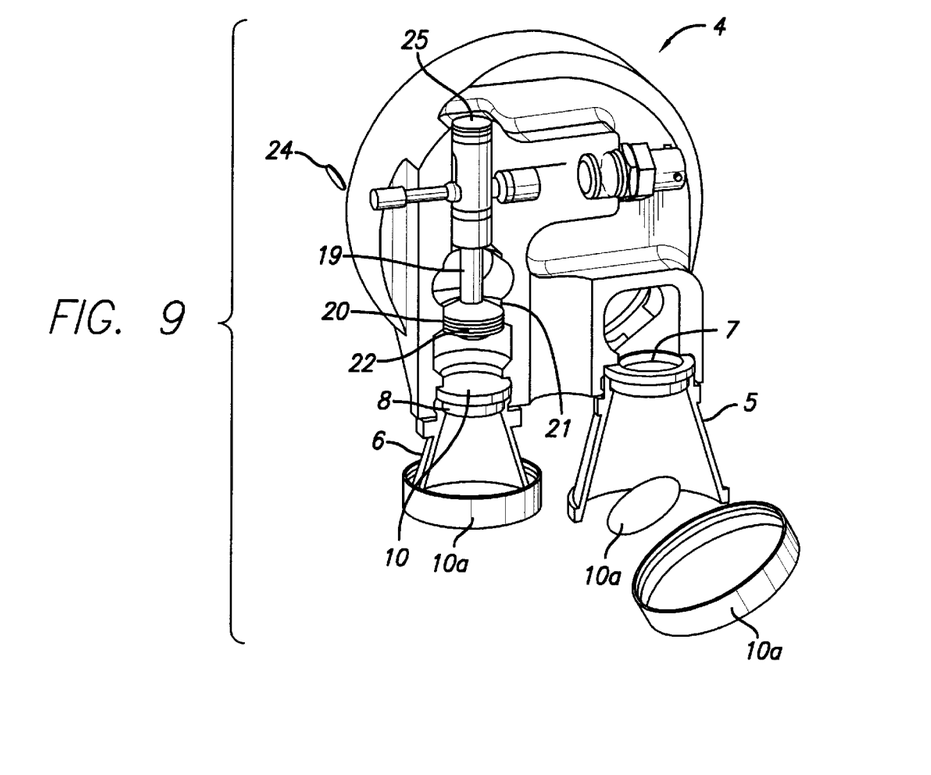
FIG. 9 is a view corresponding to that of FIG. 8 illustrating the arrangement upon ignition in an alternative mode of operation.

Upon supply of an electrical signal from the ejection control circuit, the auxiliary fuse 16 of the left hand end cap 4 may be caused to fire with the result that the locking element 23 is driven away from the auxiliary fuse 16 and from the position illustrated in FIGS. 7 and 8, to the position illustrated in FIG. 9. In so moving, the locking element 23 punches out an indicating seal 24 from the casing of the left hand end cap. This provides a visual indication from outside the rocket motor of whether or not the auxiliary fuse 16 has been fired.

When the locking element 23 has been driven away from the auxiliary fuse 16 to the position illustrated in FIG. 9, it becomes lockingly engaged with the valve member 19 thereby preventing the valve member 19 from moving out of its initial position in which the valve surface 20 sealingly engages with the valve seat 21. Therefore, energisation of the auxiliary fuse 16 at the left hand end cap 4 prevents the passage of exhaust gas through the secondary exhaust outlet 8 at the left hand end cap 4 and hence prevents the secondary exhaust outlet from generating thrust.

In their respective first positions, the valve members 14, 19 are each arranged to have an end surface 25 substantially flush with the outer casing of the respective end cap 3, 4. This is so that a quick inspection of the outside of the end caps will reveal whether or not the respective valve member 14, 19 has moved from its first position to its second position.

It is important to appreciate that energisation of the auxiliary fuse 16 at the right hand end cap has the opposite effect to energisation of the auxiliary fuse 16 at the left hand end cap. At the right hand end cap 3, energisation of the auxiliary fuse 16 must occur to allow the light hand secondary exhaust outlet 8 to fire and produce thrust. However, at the left hand end cap 4, energisation of the auxiliary fuse must occur to prevent the left hand secondary exhaust outlet 8 from firing and producing thrust. In any event, energisation of the main ignition fuse 11 will always result in the two primary exhaust outlets 7 from firing and producing sufficient thrust to allow the ejection seat to clear the aircraft safely.

It will therefore be appreciated that the rocket motor thus described can operate in a number of different modes. For example, by firing the main charge fuse 11 and the auxiliary fuse 16 at the left hand end cap 4, both of the primary exhaust outlets 7 produce thrust but neither of the secondary exhaust outlets 8 produce thrust. However, upon energisation of the main charge fuse 11 and the auxiliary fuse 16 at the right hand end cap 3, all exhaust outlets produce thrust with the result that the total thrust produced is greater than that produced if only the two primary exhaust outlets fire.

Energisation of the main charge fuse 11 and both auxiliary fuses 16 allows the two primary exhaust outlets 7 and the right hand secondary exhaust outlet 8 to produce thrust but not the left hand secondary exhaust outlet 8, with the result that the right hand end of the rocket motor produces more thrust than the right hand end. This causes the resultant thrust generated to act along a line which is not parallel with the lines of action along which the individual thrust components generated by each firing exhaust outlet act. Therefore, this results in the rocket motor causing the ejection seat to move along a curved trajectory.

If only the main ignition fuse 11 is energised then both primary exhaust outlets 7 produce thrust but only the secondary exhaust outlet 8 at the left hand end of the rocket motor produces thrust with the result that the motor similarly follows a curved trajectory but curves in the opposite direction to that described above.

Figure 10:
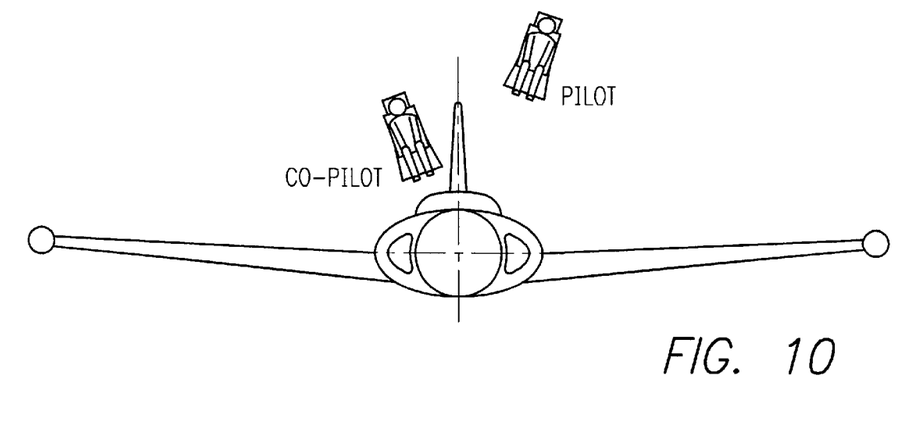
FIG. 10 is a schematic view from the front of an aircraft during ejection in accordance with one mode of operation of the rocket motor of the present invention.

The above-mentioned different modes of operation of the rocket motor are each advantageous for different ejection scenarios depending upon variables such as aircraft speed, aircraft altitude, aircraft attitude, weight of seat occupant and number of air crew. For example, when ejecting from a two-seater aircraft, it is advantageous for the pilot and co-pilot to be ejected along diverging trajectories, to reduce the risk of the air crew colliding with each other after ejection. This type of ejection sequence is illustrated in FIG. 10. As indicated in FIG. 10, the pilot is ejected by the ejection control circuit along a trajectory curving towards the port one side of the aircraft and the co-pilot is ejected, after a short delay, along a trajectory curving towards the starboard side of the aircraft. The two trajectories therefore diverge.

Figure 11:
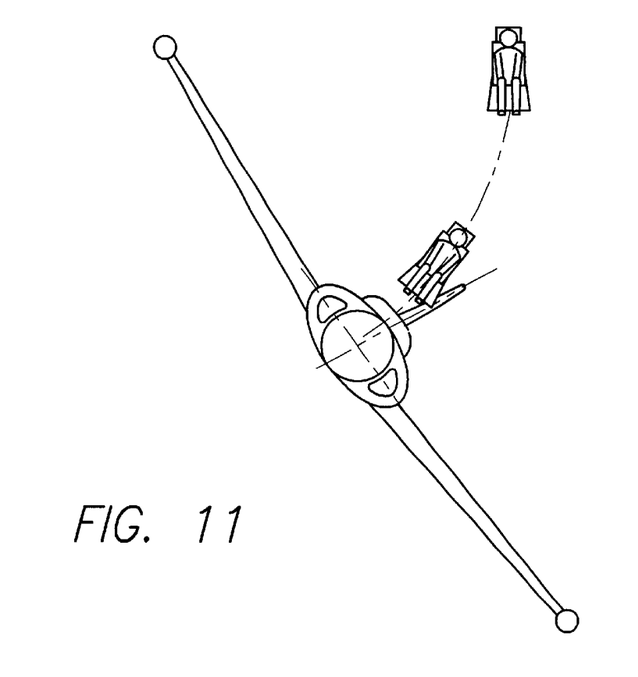
FIG. 11 is a schematic view from the front of an aircraft illustrating ejection in a second mode of operation of the rocket motor of the present invention.

FIG. 11 illustrates another ejection scenario in which the aircraft is either banking or rolling whilst flying at a low altitude. In this scenario, it is clearly disadvantageous to eject either member of the two-man crew along a trajectory directed towards the lower side of the aircraft because the ejectee may not have sufficient altitude for safe deployment of the ejection seat parachute. Therefore, in this instance, it is advantageous to eject both members of the air crew along a trajectory curving away from the lower side of the aircraft with a slightly greater delay to ensure sufficient distance between the two members of the air crew to minimise the risk of collision.

The ejection control circuit to which the rocket motor of the present invention is intended to be connected constantly determines the most appropriate mode of ejection depending upon parameters such as aircraft altitude, aircraft attitude, aircraft speed and air crew mass. Having determined the most appropriate ejection procedure, the ejection control circuit then provides the appropriate electrical signals to the fuses of the rocket motor of the present invention to fire the appropriate combination of exhaust outlets to provide the correct trajectory. However, it is to be appreciated that means other than an electronic ejection control circuit may be used to control the rocket motor of the present invention. For example, the rocket motor may be controlled by a mechanical device such as borostatic bellows, or accelerometers. The rocket motor could be connected to an aircraft's data logging system to obtain the necessary feed back regarding night parameters to control ejection.

The rocket motor arrangement described above is a failure tolerant design which ensures that even if the auxiliary fuses 16 fail to fire for whatever reason, the rocket motor still produces thrust through both primary exhaust outlets and one secondary exhaust outlet so as to provide sufficient total thrust to clear the aircraft and provide a curved trajectory so as to clear the tail plane of the aircraft. When installed in a two-seater aircraft, it is envisaged that the end caps of the rocket motor beneath the co-pilot's ejection seat will be reversed as compared to those of the rocket motor provided beneath the pilot's ejection seat so as to ensure that even upon failure of all auxiliary fuses 16, the pilot and co-pilot's seats are still ejected along divergent trajectories.

The rocket motor of the present invention is intended to be used with a composite propellant comprising a fuel component and an oxidant such as ammonium chlorate.

The rocket motor of the present invention is furthermore particularly intended to be used with a non-platonised propellant composition. Non-platonised propellant is characterised by a linear relationship between burn rate and propellant pressure. Because adjustment of the effective exhaust outlet area of the rocket motor has a direct relationship upon the pressure within the combustion chamber 2, a linear relationship between burn rate and pressure is advantageous because it allows direct control over the burn rate of the propellant by adjusting the effective exhaust outlet area. Non-platonised propellants comprise a catalyst which initially raises the burn rate of the propellant relative to a non-platonised propellant. However, the burn rate of a platonised propellant then reduces to become almost constant with increasing pressure before beginning to increase further with increased pressure. In other words, the relationship between burn rate and pressure for a platonised propellant is non-linear with the result that nozzle adjustment would provide less predictable control over the burn rate.

The preferred propellant for use with the rocket motor of the present invention is ROWANITE 607. ROWANITE 607 is a composite propellant based upon a rubbery hydroxyl terminated polybutadiene (HTPB) binder and ammonium perchlorate filler. A small amount of refractory can be added to suppress acoustically driven combustion instability.

ROWANITE 607 consists essentially of a uniform mixture of the following ingredients:

Ammonium Perchlorate,

HTPB Binder System,

Bonding Agent,

Ballistic Modifier,

Antioxidant,

Curing Agent, and

Cure Rate Modifier

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realisinig the invention in diverse forms thereof.

What is claimed:

1. An ejection seat having a single rocket motor comprising a single combustion chamber, a plurality of exhaust outlets in fluid communication with the combustion chamber, and selection means operable to select from said plurality of exhaust outlets one or more exhaust outlets through which to allow the passage of exhaust gas upon ignition of propellant within the combustion chamber, so as to direct the ejection seat along a curved trajectory.

2. An ejection seat according to claim 1, wherein said selection means comprises a valve means associated with at least one of the plurality of exhaust outlets, the valve means being moveable from a first position in which substantially no exhaust gas is allowed to pass through the respective exhaust outlet, to a second position in which substantially unrestricted flow of exhaust is allowed through the respective exhaust outlet.

3. An ejection seat according to claim 1, wherein said selection means comprises a valve means associated with at least one of the plurality of exhaust outlets, the valve means being moveable from a first position in which substantially unrestricted flow of exhaust gas is allowed through the respective exhaust outlet, to a second position in which substantially no exhaust gas is allowed to pass through the respective exhaust outlet.

4. An ejection seat according to claim 2, further including valve indicator means arranged to provide a visual indication from outside the rocket motor of whether the or each valve means is in its respective first or second position.

5. An ejection seat according to claim 2, wherein said selection means comprises a fuse actuable to allow movement of one or more of said valve means from their respective first positions to their respective second positions.

6. An ejection seat according to claim 5, wherein said selection means comprises a separate fuse associated with each valve means.

7. An ejection seat according to claim 5, wherein the or each fuse comprises an explosive charge.

8. An ejection according to claim 5, wherein the or each fuse is arranged to move a locking element into or out of locking engagement with the or each valve means upon actuation of the fuse so as to prevent or allow respectively movement of the or each valve means from its first position to its second position.

9. An ejection seat according to claim 8, further including locking element indicator means arranged to provide a visual indication from outside the rocket motor of whether the or each locking element is in or out of locking engagement with the or each valve means.

10. An ejection seat according to claim 1, comprising at least one primary exhaust outlet and at least one secondary exhaust outlet, the magnitude of thrust produced by the or each primary exhaust outlet upon ignition of a propellant within the combustion chamber being greater than the magnitude of thrust produced by the or each secondary exhaust outlet.

11. An ejection seat according to claim 10, wherein the or each primary exhaust outlet is arranged so as always to allow the passage of exhaust gases upon ignition of a propellant within the combustion chamber.

12. An ejection seat according to claim 10, wherein the selection means is arranged to select whether or not to allow the passage of exhaust gases through any of the or each secondary exhaust outlets.

13. An ejection seat according to claim 1, provided with an ignition fuse to ignite a propellant within the combustion chamber.

14. An ejection seat according to claim 1, wherein each exhaust outlet is provided with a nozzle.

15. An ejection seat rocket motor according to claim 1, provided with a combustible propellant within the combustion chamber.

16. An ejection seat according to claim 15, wherein the propellant is a composite propellant comprising a fuel and an oxidant.

17. An ejection seat according to claim 15, wherein the propellant is non-platonised.

* * * * *

UNITED STATES PATENT AND TRADEMARK OFFICE
CERTIFICATE OF CORRECTION

PATENT NO. : 6,591,602 B1  Page 1 of 1
DATED : July 15, 2003
INVENTOR(S) : Stephen Anthony George Ruff It is certified that error appears in the above-identified patent and that said Letters Patent is hereby corrected as shown below:

Title page,
Item [56], U.S. PATENT DOCUMENTS, add:
-- 4,017,040   4/1977        Dillinger et al.
   4,667,903   5/1987        Herndone
   5,456,425   10/1995       Morris et al. --.
Add new heading and the following patents:
-- FOREIGN PATENT DOCUMENTS
   UK    1 226 991    3/1971
   GB    1 348 379    3/1974
   GB    2 115 758 A  9/1983
   EPO   0 211 337    5/1987 --.

Column 9,
Line 6, after "ejection", add -- seat --.

Column 10,
Line 14, delete "rocket motor".

Signed and Sealed this

Eleventh Day of November, 2003

JAMES E. ROGAN
*Director of the United States Patent and Trademark Office*